US 8,527,803 B2

(12) United States Patent
Paul et al.

(10) Patent No.: US 8,527,803 B2
(45) Date of Patent: Sep. 3, 2013

(54) SYSTEM AND METHOD FOR MULTIPLE BACKPLANE TIME SYNCHRONIZATION

(75) Inventors: Indrani Paul, Round Rock, TX (US); Timothy M. Lambert, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 285 days.

(21) Appl. No.: 13/020,563

(22) Filed: Feb. 3, 2011

(65) Prior Publication Data

US 2012/0204055 A1    Aug. 9, 2012

(51) Int. Cl.
*G06F 1/12*        (2006.01)
(52) U.S. Cl.
USPC .......................................... 713/503; 713/401
(58) Field of Classification Search
USPC .................................. 713/401, 503
See application file for complete search history.

(56) References Cited

U.S. PATENT DOCUMENTS 5,696,951 A * 12/1997 Miller ........................... 713/503
7,581,133 B2    8/2009 Lambert et al. ............... 713/601

OTHER PUBLICATIONS

United States Patent Application; U.S. Appl. No. 12/840,999; pp. 30, Jul. 21, 2010.

* cited by examiner

*Primary Examiner* — Glenn A Auve
(74) *Attorney, Agent, or Firm* — Baker Botts L.L.P.

(57) ABSTRACT

A system and method for synchronizing multiple backplanes within an information handling system are disclosed. An information handling system includes a first controller that may be operable to generate a time command at a predetermined time interval. A backplane including a second controller is communicatively coupled to the first controller. The second controller may be operable to receive the time command from the first controller and calculate a skew for the time command based at least on a location of the backplane. The second controller may further be operable to adjust a time domain of the backplane based on the calculated skew for the time command to synchronize the backplane.

17 Claims, 3 Drawing Sheets

SYSTEM AND METHOD FOR MULTIPLE BACKPLANE TIME SYNCHRONIZATION

TECHNICAL FIELD

The present disclosure relates in general to information handling systems, and more particularly to a system and method for multiple backplane time synchronization.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems become more complex due to increasing operating demands, there is a need for increased storage density and a desire for modularity that results in the use of backplane configurations. Current information handling systems may support multiple types of storage controllers (e.g., host bus adaptor (HBA), chipset serial attached SCSI (SAS), chipset peripheral component interconnect (PCI), etc.) and various storage technologies (e.g., mechanical motor, SAS, PCIs, solid state drive (SSD), etc.) attached to multiple modular backplanes. Generally, these backplanes are all independently managed by the onboard storage enclosure processor (SEP), such that the backplanes are in disparate time domains and are not synchronized.

SUMMARY

In accordance with the present disclosure, the disadvantages and problems associated with synchronizing multiple back planes have been substantially reduced or eliminated. In a particular embodiment, an information handling system includes a first controller that may be operable to generate a time command at a predetermined time interval. A backplane including a second controller may be communicatively coupled to the first controller. The second controller may be operable to receive the time command from the first controller and calculate a skew for the time command based at least on a location of the backplane. The second controller may further be operable to adjust a time domain of the backplane based on the calculated skew for the time command to synchronize the backplane.

In accordance with a another embodiment of the present disclosure, a controller configured to provide time synchronization in a backplane includes a processor communicatively coupled to a memory and processing instructions encoded in the memory. The processing instructions, when executed by the processor, may be operable to perform operations including receiving a time command and calculating a skew for the time command based at least on a location of a backplane associated with the controller. The processing instructions further may be operable to perform operations including adjusting a time domain of the backplane based on the calculated skew for the time command to synchronize the backplane.

In accordance with a further embodiment of the present disclosure, a method for providing time synchronization in a backplane includes receiving a time command from a first controller at a second controller associated with a backplane and calculating a skew for the time command based at least on a location of the backplane. A time domain of the backplane may be adjusted based on the calculated skew for the time command to synchronize the backplane.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1A:
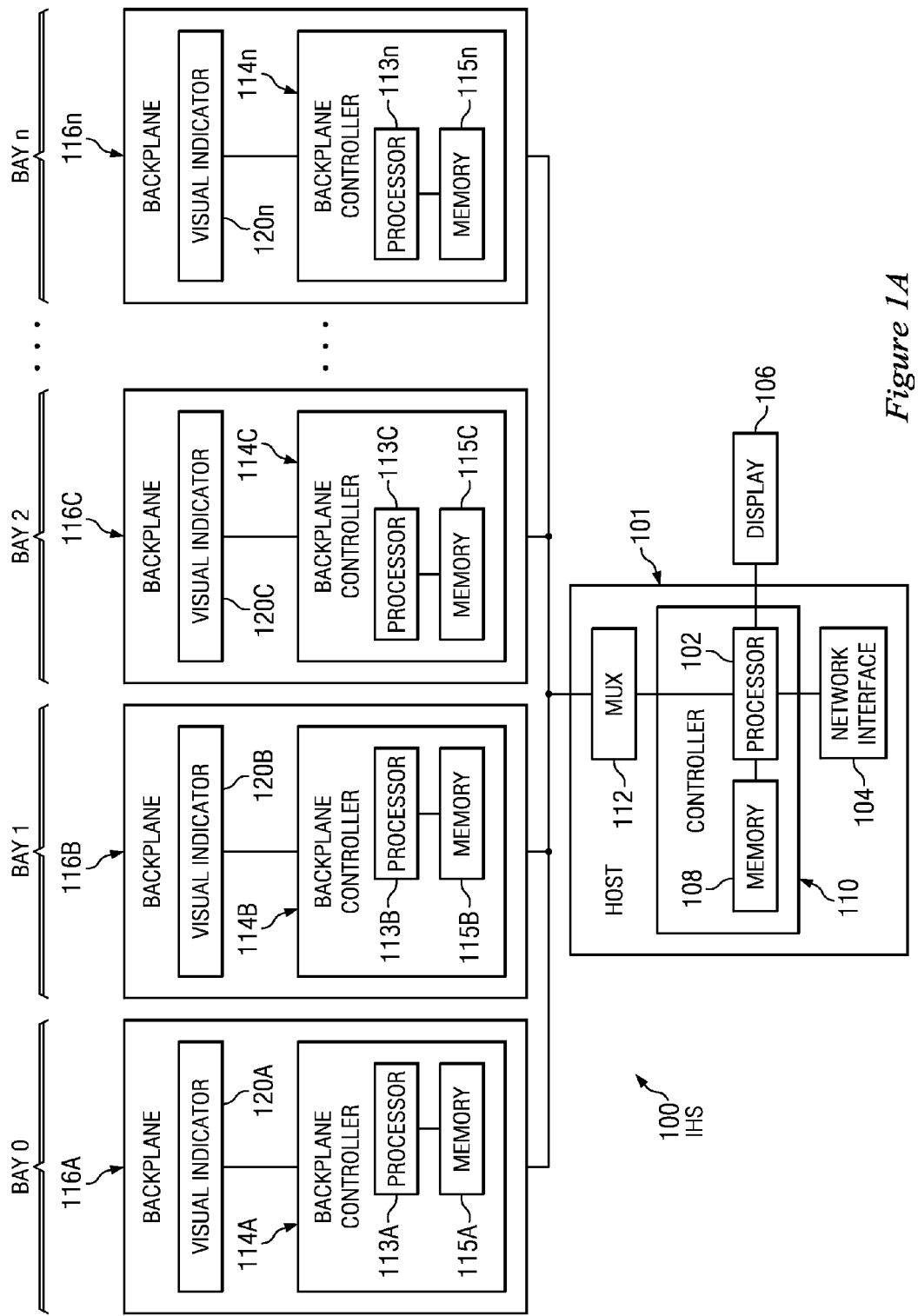
FIGS. 1A-1B illustrate block diagrams of example embodiments of an information handling system configured for time synchronization across multiple backplanes in accordance with the teachings of the present disclosure.
Figure 1B:
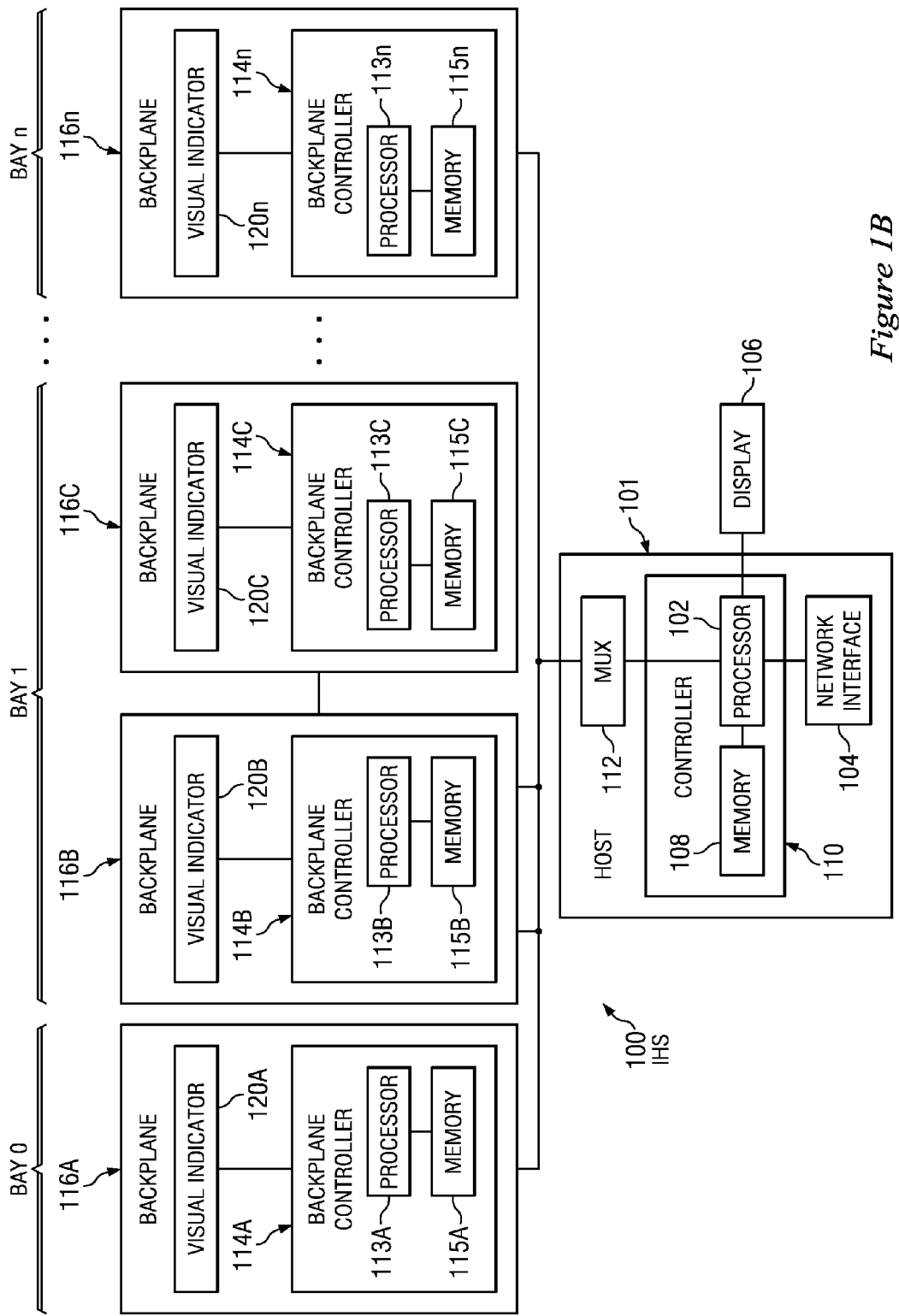
Figure 2:
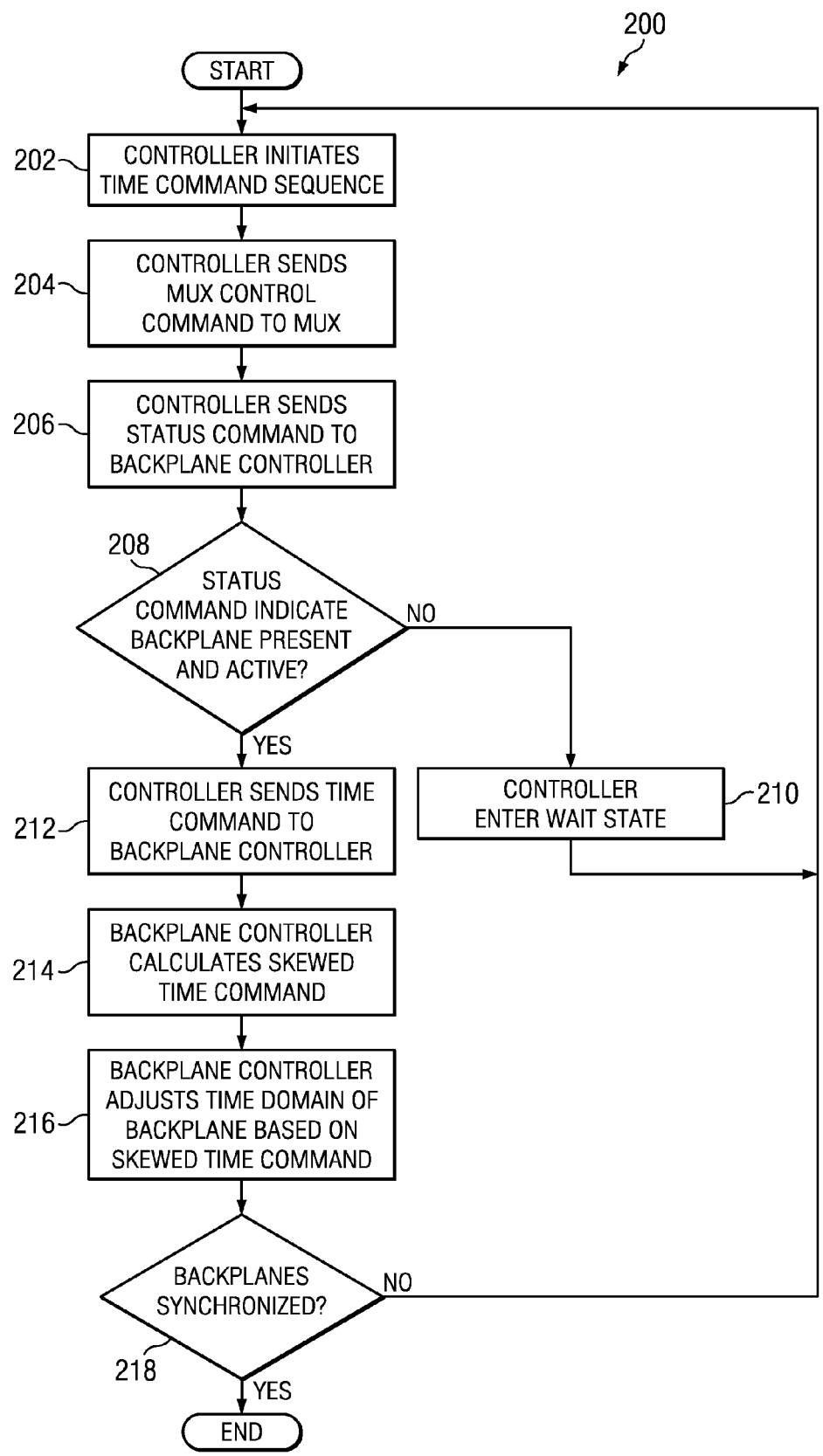
FIG. 2 illustrates a flow chart of an example method for providing a time synchronization across multiple backplanes in accordance with the teachings of the present disclosure.

Embodiments of the present disclosure and their advantages are best understood by reference to FIGS. 1 and 2, where like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

FIG. 1A illustrates a block diagram of example information handling system 100 including host 101 having controller 110 configured to provide time synchronization across multiple backplanes 116 in accordance with the teachings of the present disclosure. Information handling system 100 may be a modular system that includes multiple bays where each bay includes one or more devices (e.g., blades) associated with at least one backplane controller. In some embodiments, information handling system 100 may include host 101 communicatively coupled to backplanes 116.

Host 101 may generally be operable to receive data from and/or communicate data to one or more other information handling systems via a network (not expressly shown). In certain embodiments, host 101 may be a server. In another embodiment, host 101 may be a personal computer (e.g., a desktop computer or a portable computer). As depicted in FIG. 1, host 101 may include controller 110 communicatively coupled to (MUX) 112 and network interface 104. Host 101 may also include a memory and a process (not expressly shown) for storing and executing program instructions.

Controller 110 may include any element, device, and/or programming operable to communicatively couple with processor 102 and facilitate operation of information handling system 100. For example, controller 110 may be a baseboard management controller (BMC) and/or a remote access controller (RAC) (e.g., a Dell Remote Access Controller (DRAC) or an Integrated Dell Remote Access Controller (iDRAC)) configured to generate a time command and send the time command to backplane controllers 114 of backplanes 116, which use the time command to internally skew the time domain of backplanes 116 based on the location (e.g., bay number) of backplanes 116. Controller 110 may include processor 102 and memory 108 communicatively coupled to the processor.

Processor 102 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 102 may interpret and/or execute program instructions and/or process data stored in memory 108 and/or another component of information handling system 100 and may output results, graphical user interfaces (GUIs), websites, and the like via display 106 or over network interface 104.

Memory 108 may be communicatively coupled to processor 102 and may comprise any system, device, or apparatus operable to retain program instructions or data for a period of time. Memory 108 may comprise random access memory (RAM), electrically erasable programmable read-only memory (EEPROM), a PCMCIA card, flash memory, or any suitable selection and/or array of volatile or non-volatile memory that retains data after power to information handling system 100 is turned off.

Network interface 104 may be any suitable system, apparatus, or device operable to serve as an interface between information handling system 100 and a network (not expressly shown). Network interface 104 may enable information handling system 100 to communicate over a network using any suitable transmission protocol and/or standard, including without limitation all transmission protocols and/or standards known in the art. Although network interface 104 is illustrated as being separate from controller 110 in FIGS. 1A and 1B, network interface 104 may be integral to controller 110.

Multiplexer (MUX) 112 may be a general purpose Input/Output (I/O) based MUX and may be configured to communicatively couple backplane controllers 114 to controller 110. MUX 112 may further be configured to receive a MUX control command from controller 110 in order to select one of backplane controllers 114 for receiving the time command. Although MUX 112 is illustrated as being separate from controller 110 in FIGS. 1A and 1B, MUX 112 may be integral to controller 110.

Display 106 may be communicatively coupled to host 101 and comprise any display device suitable for creating graphic images and/or alphanumeric characters recognizable to a user, and may include, for example, a liquid crystal display (LCD) or a cathode ray tube (CRT).

Backplanes 116 may be communicatively coupled to controller 110 and may be any one of a SEP backplane, a serial attached SCSI (SAS) backplane, a SAS extender backplane, and/or any other suitable backplane configurations. In the illustrated embodiment, each of backplanes 116 may include backplane controller 114 and visual indicator 120. Additionally, any number of devices and/or storage resources, such as for example, hard disk drives, solid state drives, just a bunch of disks (JBOD), etc may be coupled to backplanes 116.

At startup, the devices associated with each backplane 116 may have unique startup sequences that affect the initiation of the clocks and timers in the devices. Therefore, each backplane 116 may have a unique time domain that operates asynchronously to the time domains of the other backplanes. In addition, backplanes 116 may enter a sleep mode for power savings and/or devices may be added (e.g., hot plugged) during operation of information handling system 100. These devices may also have asynchronous time domains. Given that data is constantly being updated on the devices, it may be preferable to ensure that two or more of backplanes 116 across information handling system 100 are synchronized when information is exchanged between the devices in different backplanes 116. Furthermore, backplanes 116 may include devices that are located in different bays but that are grouped into logical units such that the group of devices acts as a contiguous storage unit. Thus, providing a single time domain for the group of devices may be preferable in order to maintain data accuracy between the devices associated with different backplanes 116.

Backplane controllers 114 may be configured to receive the time command sent from controller 110 and may calculate the skew for associated backplanes 116 in order to synchronize backplanes 116 in one time domain. In some embodiments, backplane controllers 114 may be a storage enclosure processor (SEP) controller or other suitable controller configured to receive a time command and calculate a skew in the time domain for backplanes 116.

Backplane controllers 114 may include processor 113 and memory 115 communicatively coupled to processor 113. Processor 113 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data stored in the memory. Memory 115 may comprise any system, device, or apparatus operable to retain program instructions or data for a period of time. For example, memory 115 may comprise random access memory (RAM), electrically erasable programmable read-only memory (EEPROM), a PCMCIA card, flash memory, or any suitable selection and/or array of volatile or non-volatile memory that retains data after power to information handling system 100 is turned off.

In some embodiments, each of backplane controllers 114 may receive the time command from controller 110 at different times. For example, backplane controller 114A associated with Bay 0 may receive a first broadcast of the time command and backplane controller 114B associated with Bay 1 may receive a second broadcast of the time command, where the second broadcast is at later point in time than the first broadcast. Backplane controllers 114, knowing the location (e.g., bay number) of the associated backplane 116 with respect to other backplanes 116 in information handling system 100, may determine a skew for the received time command in order to synchronize the time domains of backplanes 116. For example, backplane controllers 114 may use the following equation to determine the skew for associated backplanes 116:

Backplane Skew=(Delay of time command)*(Bay Number+1)

where the "delay of time command" may account for at least the duration of a time command, the time at which the time command was sent by controller 110 and the delay between controller 110 and backplane 116, including the delay through MUX 112 and/or other transmittal delays.

In operation, controller 110 may generate a time command at a predetermined time interval set arbitrarily by processor 102, or a user of information handling system 100 and broadcast the time command to all or some of backplanes 116 via MUX 112. Based at least on the time at which controller 110 broadcasted the time command, the delay between controller 110 and backplanes 116, and the location of each backplane 116, each backplane controller 114 may skew the time command for an associated one of backplanes 116 such that the time domains are substantially synchronous across all or some of backplanes 116.

For example, referring to FIG. 1A, controller 110 may begin by sending a status command to each of the bays to determine if the bay is populated with a device and that device is active. If the status command indicates that a device is present and active in one or more of the bays, controller 110 may generate a time command and send the time command to one of backplanes 116 via MUX 112 at a first time interval. In one embodiment, the status and time commands may be part of a beacon routine for use on an I2C bus. If the status command determines that a device is not present and/or active in one of the bays, controller 110 may enter a wait state for approximately the duration of one time command. In one embodiment, the duration of a time command may be calculated based the clock rate of the bus, the number of clocks for a time command, the time for the select toggle of MUX 112 and the stop setup. For example, the equation to calculate the duration of a time command may be as follows:

(Duration of time command)=((Bus clock rate)* (Number of clocks for a time command))+(MUX control toggle time)+(Stop setup)

In some embodiments, the devices associated with backplanes 116 may be organized into logical groups and controller 110 may broadcast a time command to backplanes 116 based on the logical groups. For example, backplanes 116 may be physically located in separate bays but certain ones of the devices associated with backplanes 116 may be organized into one or more logical groups. In one example, the devices associated with backplanes 116A and 116C may be a first logical group and the devices associated with backplanes 116B and 116n may be a second logical group. In this example, controller 110 may broadcast a first time command for the first group in order to synchronize the time domains of backplanes 116A and 116C associated with the devices in the first group and may broadcast a second time command for the second group in order to synchronize the time domains of backplanes 116B and 116n associated with the devices in the second group. The time domain of backplanes 116A and 116C in the first logical group may be different than the time domain of backplanes 116B and 116n in the second logical group. Controller 110 may broadcast the respective time command to each of backplanes 116 in the first or second logical groups at a predetermined interval. In other embodiments, the devices associated with backplanes 116 may not be separated into groups and the time command sent by controller 110 may be used to synchronize the time domains of all backplanes 116.

When the time command is received at backplanes 116, backplane controllers 114 may generate an interrupt in order to calculate the skew time for associated backplane 116. As described above, the skew for backplanes 116 may be calculated based on the location of the backplane (e.g., the bay number) and the delay of the time command. In one embodiment, backplane controllers 114 may calculate the delay of the time command based on the order in which controller 110 sends a time command to each of backplane controllers 114. For example, controller 110 may broadcast time command at a first time to backplane controller 114A and at a second time, which is later than the first time, to backplane controller 114B. In some embodiments, backplane controllers 114 may also determine the delay time between when the time command is sent from controller 110 and when the time command is received at backplanes 116. This delay time may include the delay caused by MUX 112, any setup delays, toggle delays, and/or other delays. Once the delay for the time command is determined, backplane controllers 114 may calculate the skew for the time command and may subsequently adjust the time domain of associated backplanes 116 based on the skewed time command in order to synchronize backplanes 116 in one time domain.

Referring to FIG. 1B, backplanes 116B and 116C may be arranged in a daisy-chain configuration. In some embodiments, backplane controller 114B may be configured to synchronize the primary backplane, e.g., backplane 116B by determining the delay between the time at which controller 110 sends the time command and when backplane controller 114B receives the time command, the delay caused by MUX 112, setup delays, toggle delays, any previous bay synchronization delays (e.g., delays from synchronizing backplane 116A), wait state delays, and/or any other delays. Once the primary backplane is synchronized, the slave backplane, e.g., backplane 116C may be synchronized by backplane controller 114C. In some embodiments, primary backplane 116B may synchronize slave backplane 116C by determining the delay between the two backplanes and may provide the updated time command to slave backplane 116C. Additionally, as described in the example embodiments above, the synchronization may occur via the I2C bus that may interconnect the components of information handling system 100. For example, backplane controller 114B may master the bus and communicate commands to slave devices such as backplane 116C to complete synchronization of information handling system 100.

FIG. 2 illustrates a flow chart of a method for providing a time synchronization across multiple backplanes in accordance with certain embodiments of the present disclosure. Generally, controller 110 may broadcast a time command to backplanes 116. Backplane controllers 114 associated with backplanes 116 may calculate a skew for the time command. The skew may be based on the location of backplanes 116 (e.g., the bay number) and the delay for the time command. Once the appropriate skew is calculated, backplane controllers 114 may adjust the time domain of associated backplanes 116 based on the skewed time command in order to synchronize two or more of backplanes 116 in one time domain.

Method 200 begins at step 202 when controller 110 may initiate a time command sequence to synchronize the time domains of backplanes 116. In one embodiment, controller 110 may synchronize backplanes 116 in a predetermined order. For example, the predetermined order may be sequential based on the bay number housing backplanes 116. In another example, the predetermined order may be based on the organization of the devices associated with backplanes 116 into logical groups. In another embodiment, controller 110 may synchronize backplanes 116 on an as needed basis. For example, a device may be hot plugged into information handling system 100 during operation or a device associated with backplanes 116 may wake up after a time period in a sleep or inactive mode such that the time domain for the device is asynchronous from the time domain of backplanes 116. In one embodiment, controller 110 may initiate the time command sequence by initiating a beacon routine via an I2C bus.

At step 204, controller 110 may generate a MUX control command and communicate the MUX control command to MUX 112 in order to select which of backplane 116 will receive the time command. In one embodiment, the order in which controller 110 sends the MUX control command to MUX 112 may be sequential based on the bay number (e.g., a first time command is sent to backplane 116A in Bay 0, a second time command is sent to backplane 116B in Bay 1, etc). In other embodiments, the order in which controller 110 sends the MUX control command to MUX 112 to select one of backplanes 116 may be predetermined based on the organization of the devices associated with backplanes 116 into logical groups. For example, the devices associated with backplanes 116A and 116C as illustrated in FIG. 1A may be a logical group. Controller 110 may generate the MUX control command to select one of backplanes 116 based on bay numbers such that the MUX control command may be used by MUX 112 to first select backplane 116A in Bay 0 and subsequently select backplane 116C in Bay 2.

At step 206, controller 110 may generate a status command and send the status command to the selected one of backplanes 116. For example, the synchronization order for backplanes 116 may be based on bay number and controller 110 may send the first broadcast of the status command to backplane 116A in Bay 0. At step 208, the status command may be used to determine the state of backplane 116A, e.g., whether a device is associated with backplane 116A and whether that device is active. If the status command determines that a device is not present and/or the device is not active, controller 110 may enter a wait state at step 210 and return to step 202 to initiate another time command sequence for the next bay (e.g., Bay 1).

If the status command determines that a device associated with backplane 116A is present and active, controller 110 may send a time command at a predetermined interval to backplane 116A at step 212. In one embodiment, backplane controller 114A associated with backplane 116A may generate an interrupt when the time command is received. Once the time command is received, backplane controller 114A may calculate a skew for the time command at step 214. The calculated skew may be based at least on the associated bay information (e.g., the bay number) and the duration of the time command. In some embodiments, the duration of the time command may include the time at which the time command was generated, the time for generating the time command and the delay in communicating the time command from controller 110 to backplane 116A. Once backplane controller 114A calculates the skew for the time command, backplane controller 114A may adjust the time domain of backplane 116A based on the skewed time command at step 216 in order to synchronize the time domain of backplane 116A.

At step 218, controller 110 determines whether backplanes 116 in information handling system 100 have been synchronized. If not all backplanes 116 have been synchronized, controller 110 returns to step 202 to synchronize the next one of backplanes 116 in the predetermined order. If all backplanes 116 have been synchronized, method 200 ends. In one embodiment, each of backplanes 116A-n may be synchronized to be in the same time domain. In other embodiments, backplanes 116 may be divided into one or more groups such that the backplanes in the group may be synchronized to be in one time domain.

While the above examples illustrate a system and method for providing a time command to substantially synchronize the time in each of backplanes 116, the system and method of the present disclosure may be used to provide a time command for other applications. In some embodiments, each of backplanes 116 may include visual indicator 120 (as illustrated in FIGS. 1A and 1B), such as, for example, an alphanumeric display, a light emitting diode (LED), etc. Visual indicator 120 may provide a visual status of each backplane 116 to administrators, service individuals, and/or other users of backplanes 116. For example, visual indicators 120 may be used to determine if backplanes 116 have synchronized time domains. In one embodiment, each of backplanes 116 may include a LED indicator. If backplanes 116 are synchronized, the associated LED indicators of each backplane 116 may substantially "blink" at the same time. If any one of backplanes 116 are out of sync time-wise, the associated LED indicator may blink at a different rate. In some embodiments, the status of backplanes 116 may be communicated back to controller 110 in the form of data from a read of status register or some other method.

In some embodiments, controller 110 may be configured to provide a time command that allows for grouping two or more devices associated with backplanes 116 based on, for example, domain information, topography information (e.g., size, speed, type of storage resource, and/or other characteristics of backplanes 116), technology controller, RAID configuration, and/or the utilization of two or more backplanes. Backplane controllers 114 may calculate a skew for the time command such that the visual indicators 120 of the grouped backplanes 116 are in sync, e.g., LED indicators blink at substantially the same time, allowing for easy, visual confirmation by a user.

The examples illustrated above have the advantages of utilizing existing infrastructures to synchronize backplanes 116 in information handling system 100 without the requirement of extra hardware. Additionally, the present disclosure provides a system and method for synchronizing devices associated with backplanes 116 located in different bays based on the location of a bay.

Although the present disclosure has been described in detail, it should be understood that various changes, substitutions, and alterations can be made hereto without departing from the spirit and the scope of the disclosure as defined by the appended claims.

What is claimed is:

1. An information handling system configured to provide time synchronization in a backplane, the information handling system comprising:
   a controller configured to generate a time command at a predetermined time interval;
   a multiplexer communicatively coupled to the controller; and a backplane communicatively coupled to the controller, the backplane including a backplane controller configured to:

receive the time command from the controller;

calculate a skew for the time command based at least on a location of the backplane and a delay caused by a multiplexer, the multiplexer communicatively coupled between the backplane and the controller; and adjust a time domain for the backplane based on the skew for the time command.

2. The information handling system of claim 1, wherein the controller comprises a baseboard management controller or a random access card controller.

3. The information handling system of claim 1, wherein the backplane controller comprises a storage enclosure processor controller.

4. The information handling system of claim 1, wherein the backplane controller is further configured to calculate the skew for the time command based at least on one of a setup delay, a toggle delay, and synchronization delay.

5. The information handling system of claim 1, further comprising:

the backplane controller configured to:
receive the time command from the controller at a first time;
calculate the skew for the time command based at least on the location of the backplane and the first time; and
adjust the time domain for the backplane based on the skew for the time command; and a second backplane communicatively coupled to the controller, the second backplane including a second backplane controller configured to:
receive the time command from the controller at a second time;
calculate a second skew for the time command based at least on a location of the second backplane and the second time; and
adjust a second time domain for the second backplane based on the second skew for the time command such that the time domain and the second time domain are synchronized.

6. The information handling system of claim 1, further comprising a plurality of backplanes organized in at least one logical group.

7. The information handling system of claim 1, further comprising:

a second backplane communicatively coupled to the backplane.

8. The information handling system of claim 7, wherein the backplane controller is configured to:

determine a delay time based at least on the delay time caused by the backplane; and provide a new time command to the second backplane based at least on the delay time caused by the backplane.

9. A backplane comprising a controller including:

a processor;

a memory communicatively coupled to the processor; and processing instructions encoded in the memory, the processing instructions, when executed by the processor, operable to perform operations comprising:
receiving a time command;
calculating a skew for the time command based at least on a location of the backplane and a transmittal delay caused by a multiplexer communicatively coupled between the backplane and the controller; and
adjusting a time domain for the backplane based on the calculated skew for the time command to synchronize the backplane.

10. The controller of claim 9, wherein the processing instructions are further operable to perform operations comprising calculating the skew for the time command based at least on a broadcast time for the time command.

11. The controller of claim 9, wherein the processing instructions are further operable to perform operations comprising calculating the skew for the time command based at least on one of a setup delay, a toggle delay, and synchronization delay.

12. The controller of claim 9, wherein the controller comprises a storage enclosure processor controller.

13. A method for providing time synchronization in a backplane, the method comprising:

receiving a time command from a controller at a backplane controller, the backplane controller associated with a backplane;

calculating a skew for the time command based at least on a location of the backplane and a transmittal delay caused by a multiplexer communicatively coupled between the controller and the backplane; and adjusting a time domain for the backplane based on the calculated skew for the time command to synchronize the backplane.

14. The method of claim 13, wherein the controller comprises a baseboard management controller or a random access card controller.

15. The method of claim 13, wherein the backplane controller comprises a storage enclosure processor controller.

16. The method of claim 13, wherein calculating the skew for the time command further comprises calculating the skew based at least on a broadcast time for the time command.

17. The method of claim 13, calculating the skew for the time command further comprises calculating the skew based at least on one of a setup delay, a toggle delay, and synchronization delay.

* * * * *